United States Patent [19]
Lipp

[11] 4,175,942
[45] Nov. 27, 1979

[54] METHOD OF GLASS DRAWING

[75] Inventor: George D. Lipp, Painted Post, N.Y.

[73] Assignee: Corning Glass Works, Corning, N.Y.

[21] Appl. No.: 895,539

[22] Filed: Apr. 12, 1978

[51] Int. Cl.² .............................................. C03B 17/00
[52] U.S. Cl. ......................................... 65/60 B; 65/32;
65/66; 65/354; 65/187; 65/193
[58] Field of Search ............. 65/32, 60 B, 60 C, 187,
65/193, 88, 353, 354, 63, 64, 66

[56] References Cited
U.S. PATENT DOCUMENTS

| | | | |
|---|---|---|---|
| 1,724,793 | 8/1929 | Clark et al. | 65/102 X |
| 3,275,470 | 9/1966 | Charles | 65/32 X |
| 3,276,853 | 10/1966 | Eakins | 65/32 X |
| 3,937,623 | 2/1976 | Kononko et al. | 65/88 |

*Primary Examiner*—Arthur D. Kellogg
*Attorney, Agent, or Firm*—Burton R. Turner; John P. DeLuca

[57] ABSTRACT

In the drawing of glass, steam or water vapor is introduced into the atmosphere surrounding the glass while the same is being formed to reduce or inhibit breakage of the glass during the drawing operation.

4 Claims, 1 Drawing Figure

U.S. Patent  Nov. 27, 1979  4,175,942
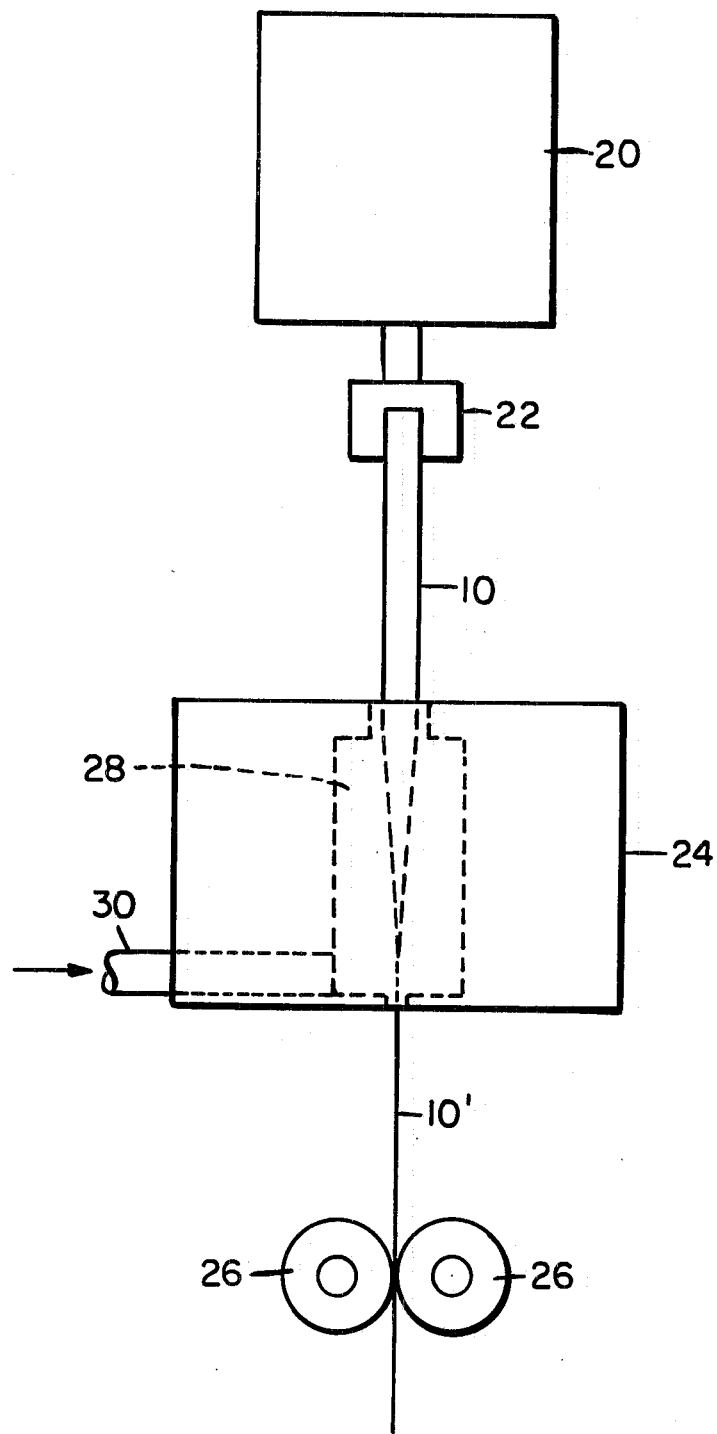

METHOD OF GLASS DRAWING

BACKGROUND OF THE INVENTION

The invention resides in the field of drawn glass whether it be drawn into ribbon, sheet, rod, tubing or other shapes. The drawing of glass is commonly accomplished by two standard processes including the drawing of glass while in a flowable semimolten state as it cools from a molten condition, either from a shaped orifice or mandrel or from the surface of a pool, and the reheating of a shaped glass piece to a semimolten condition and stretching that portion in the heated zone to attenuate the same to the desired dimensions and shape. Both such processes may be intermittent, but generally are performed in a continuous manner.

In the past it has been a problem during the drawing of glass to find an acceptable combination of furnace temperature, drawing tension and drawing speed. For example, a high temperature may be undesirable since the glass may become too fluid in the forming zone to maintain its desired shape, or because exotic or highly refractory materials of construction may be required when using such high temperatures. However, by reducing the glass temperature during the drawing process, the viscosity increases which results in an increase in the required drawing tension. Due to the increase in the glass viscosity, the drawing tension is often increased to the point where the freshly formed glass is overstressed resulting in breakage. In order to correct the breakage, the drawing speed may be reduced which automatically reduces tension, however extremely low and uneconomical production rates may result, and further devitrification may occur in some glass compositions.

The present invention reduces the problem of glass breakage during drawing and in many instances virtually eliminates such problem by introducing steam or water vapor into the atmosphere surrounding the glass while it is being formed.

SUMMARY OF THE INVENTION

In its simplest form, the present invention sets forth a completely new concept in the drawing of glass articles and describes method and apparatus for accomplishing such new concept. Although the invention may be applied to virtually all glass drawing processes, it is of particular importance in the drawing of thin sheet, ribbon and thin walled tubing where breakage is most frequently encountered. The invention contemplates the drawing of glass utilizing conventional method and apparatus but with the additional provision of means for introducing steam or water vapor into the atmosphere surrounding the glass being formed. This change in atmosphere materially improves the strength of freshly drawn glass and allows the same to be drawn at low temperatures and high speeds where it would otherwise fail or break during such forming operations.

It thus has been an object of the present invention to obviate the problems of breakage encountered in the prior art processes of drawing glass by introducing water vapor into the atmosphere surrounding the glass being formed and thus materially inhibiting or reducing the breakage of such glass as it is formed.

BRIEF DESCRIPTION OF THE DRAWINGS

The FIGURE is a somewhat schematic view in elevation illustrating method and apparatus of the present invention for drawing a glass blank.

DESCRIPTION OF THE PREFERRED EMBODIMENTS

Referring now to the drawing, a support member 20 is shown having a clamp 22 for controllably feeding a master blank 10 into an electrically powered redraw furnace 24. The furnace has an open portion extending vertically therethrough which is lined with electric heating elements so as to heat and soften the blank into a flowable semimolten condition for attenuation as it passes through such opening. Suitable pulling means such as driven tractor belts or pull rollers 26 are driven to draw down and attenuate the blank 10 into a drawn article 10' of desired size and shape and withdraw the newly formed glass from the furnace for cooling into a rigid article 10'.

The furnace 24 provides a chamber 28 about the glass being formed and an inlet conduit 30, connected to a suitable source of water vapor such as steam, communicates with chamber 28. Accordingly, steam or water vapor is introduced into the chamber 28 via inlet conduit 30 so as to permeate the atmosphere surrounding the glass 10-10' being formed within the chamber, and the spent water vapor is then exhausted from the furnace through the openings provided therein for the glass 10-10'.

As a specific example, a master blank of a borosilicate glass having a width of about 5½" and a thickness of about 0.2" was heated to a semimolten state and drawn down and attenuated into a ribbon having a width of about 0.3" in a conventional redraw furnace. When the furnace atmosphere was saturated with low pressure steam, the drawing process was successfully accomplished with a draw rate of about 37" per minute in a continuous manner without experiencing breakage. However, when the source of steam was removed from the furnace, the glass ribbon broke and further attempts to restart the draw were unsuccessful due to continual breakage. The temperature within the furnace was then raised to 900° C. and the draw was again restarted and maintained with only occasional breakage. When the temperature was reduced to about 895° C. breakage of the newly formed ribbon again occured and continued during attempts to restart the draw. However, upon the reintroduction of steam into the atmosphere within the furnace and surrounding the glass while it was being formed, the temperature of the draw was able to be reduced to 880° C. and a continuous draw maintained without breakage.

Even though the exact mechanism which produces the improved drawing capabilities with the present invention may not be fully appreciated, it is known that water readily absorbs on dry glass surfaces, and that the drawing process produces new surface at a rapid rate. Possibly the hydration of this new surface may round out microscopic defects in the glass surface by a process similar to that known in the art as "acid fortification", thereby reducing the local stress risers on the surface and inhibiting breakage of the newly formed article. As an alternative, it is possible that the water may break highly stressed chemical bonds between constituent atoms of the glass at the surface, thereby allowing the surface to expand more freely without the development of high stresses and accordingly the resulting breakage.

Although the invention has been described with respect to a redraw process, it may be applied to virtually all drawing processes where glass is drawn into ribbon, sheet, rod, tubing or other shapes whether it be from a molten source or a preform; however, the process and apparatus of the present invention is of particular importance in the drawing of thin sheet, ribbon and thin walled tubing where breakage is most frequently encountered. Further, although the water vapor effect on all glass compositions is unknown, the present invention has proved successful with borosilicate glasses and particularly alkaline earth aluminoborosilicate glasses such as the following glass set forth as percent by weight: $SiO_2$, 58%; $Al_2O_3$, 15%; CaO, 10%; MgO, 7%; BaO, 6%; $B_2O_3$, 4%.

The now preferred embodiments of the invention have been set forth, however, it will be apparent to those skilled in the art that various changes and modifications may be made thereto without departing from the spirit and scope thereof as defined in the appended claims.

I claim:

1. A method of drawing glass to form an article comprising, heating a source of glass to at least a semi-molten condition, drawing glass from said heated semi-molten source thereof, introducing water vapor into the atmosphere surrounding the drawing area of said glass and surrounding said newly drawn semi-molten glass with said water vapor, permeating the atmosphere with water vapor in the area wherein said semi-molten drawn glass is being initially formed and prior to rigidifying such glass, and cooling such glass into a rigid article.

2. A method of drawing glass to form an article as defined in claim 1 including the steps of drawing said article from a molten source of glass, continuously drawing said glass from such source, and attenuating such glass into a final article while the attenuating area is surrounded by said water vapor impregnated atmosphere.

3. A method of drawing glass to form an article as defined in claim 1 including the steps of initially providing a preform, heating said preform to a semimolten state, and continuously drawing and attenuating such preform into a final article while simultaneously surrounding the drawing area thereof with said water vapor impregnated atmosphere.

4. A method of drawing glass to form an article as defined in claim 1 including the step of drawing said article from a heated source of borosilicate glass.

* * * * *